United States Patent [19]

Bichsel et al.

[11] Patent Number: 4,766,306

[45] Date of Patent: Aug. 23, 1988

[54] APPARATUS WITH ILLUMINATED ACTUATOR FOR PHOTOELECTRICALLY CONTROLLING A LOAD

[75] Inventors: Daniel Bichsel, Wangen; Martin Plüss, Aarburg, both of Switzerland

[73] Assignee: Elektro-Apparatebau Olten AG, Zürich, Switzerland

[21] Appl. No.: 913,951

[22] Filed: Oct. 1, 1986

[30] Foreign Application Priority Data

Oct. 28, 1985 [CH] Switzerland ............... 4631/85

[51] Int. Cl.⁴ .............................................. H03K 3/00
[52] U.S. Cl. ............................ 250/227; 350/96.15; 350/96.21; 340/365 P
[58] Field of Search ................... 250/227, 229; 350/96.15, 96.21, 96.20, 96.22; 340/815.15, 815.16, 815.17, 365 P

[56] References Cited

U.S. PATENT DOCUMENTS

| | | | |
|---|---|---|---|
| 4,083,625 | 4/1978 | Hudson | 350/96.15 |
| 4,315,147 | 2/1982 | Harmer | 250/227 |
| 4,398,075 | 8/1983 | Vogel | 200/314 |
| 4,423,923 | 1/1984 | Frazier et al. | 350/96.15 |
| 4,433,896 | 2/1984 | Frazier | 350/96.21 |
| 4,492,860 | 1/1985 | Brogardh et al. | 250/227 |
| 4,588,886 | 5/1986 | Snider | 250/227 |
| 4,591,712 | 5/1986 | Thalmann | 250/227 |

Primary Examiner—Edward P. Westin
Assistant Examiner—Charles F. Wieland
Attorney, Agent, or Firm—Peter K. Kontler

[57] ABSTRACT

Apparatus for controlling a load has a load operating circuit, two radiation sources, a photodetector which is responsive to radiation from one of the sources to change the condition of the circuit, and optomechanical transducer which defines a path for radiation from the sources and has a mirror which reflects radiation from the one source to the photodetector. The mirror is movable between first and second positions in one of which the quantity of reflected radiation suffices and in the other of which the quantity of reflected radiation does not suffice to change the condition of the circuit. The apparatus also comprises an electrical conductor or other suitable means for changing the intensity of radiation from the other source in response to changes in the condition of the circuit so that each change in the condition of the circuit is displayed by the transducer. The path for radiation from the one source has a frustoconical portion and the reflecting surface of the mirror is selected in such a way that its area at least matches the smallest cross-sectional area of the frustoconical portion of the path but can equal or exceed the maximum cross-sectional area of the frustoconical portion. The mirror is movable in or counter to the direction of propagation of radiation along the frustoconical portion of the path.

11 Claims, 2 Drawing Sheets

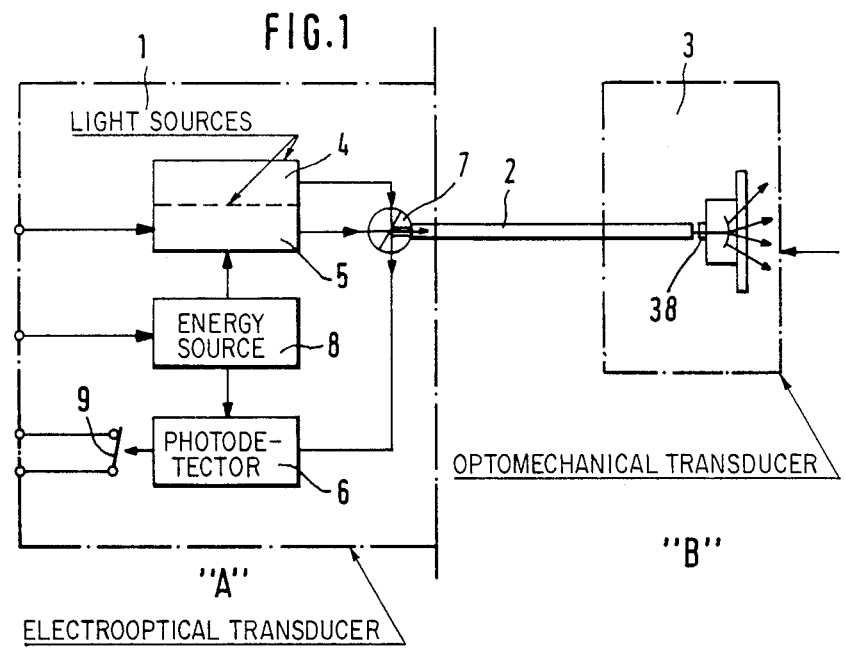
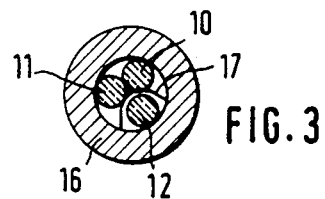
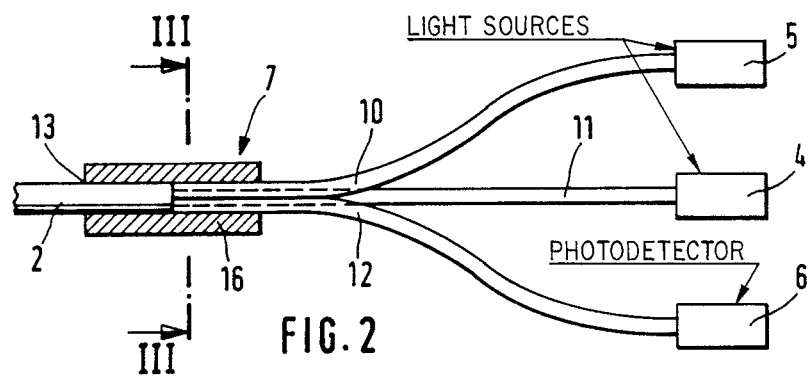

APPARATUS WITH ILLUMINATED ACTUATOR FOR PHOTOELECTRICALLY CONTROLLING A LOAD

CROSS-REFERENCE TO RELATED CASE

The apparatus of the present invention constitutes an improvement over and a further development of apparatus disclosed in commonly owned U.S. Pat. No. 4,591,712 granted May 27, 1986 to Rene A. Thalmann for "Photoelectric fiber optic sensing apparatus with illuminated actuator".

BACKGROUND OF THE INVENTION

The present invention relates to improvements in apparatus for controlling a load by means of a photodetector. More particularly, the invention relates to improvements in apparatus wherein a pushbutton, a knob or another suitable actuator can constitute an optomechanical transducer which initiates necessary changes in the condition of a load operating circuit.

Apparatus of the above outlined character are disclosed in the aforementioned commonly owned U.S. Pat. No. 4,591,712 to Thalmann as well as in U.S. Pat. No. 4,315,147 granted Feb. 9, 1982 to Alan L. Harmer for "Photoelectric switch with visible signal". The switch of Harmer employs two light sources one of which cooperates with a photodetector serving to change the condition of the load operating circuit. The purpose of the other light source is to illuminate a dial on the depressible portion of the actuator so that the person in charge can ascertain the condition of the load operating circuit. The depressible portion of the actuator carries a mirror which reflects infrared light but does not obstruct the passage of visible light. A drawback of the apparatus of Harmer is that it must employ a source of infrared light which is transmitted to the photodetector when the latter is to activate the load operating circuit, whereas the means for displaying the condition of the load operating circuit (and hence the condition of the load) must cooperate with a source of visible light. Thus, the wavelength of light which is used to activate the photodetector is substantially different from the wavelength of visible light, i.e., the damping action of the light conducting means upon one type of light is quite different from that upon the light of the other type. Consequently, the length of the light conductor means must be selected as a function of the less satisfactory damping action which, in turn, limits the length of the light conductor means. Were the apparatus of Harmer to employ two sources of visible light, the condition of the load operating circuit (i.e., the two positions of the depressible portions of the actuator) would be indicated by light having different hues which would be confusing to the operator.

OBJECTS AND SUMMARY OF THE INVENTION

An object of the invention is to provide a novel and improved load controlling apparatus which is constructed and assembled in such a way that it can operate with two sources of visible light without affecting the simplicity and clarity of indications of the condition of the circuit.

Another object of the invention is to provide a simple and compact apparatus wherein the hue and/or other characteristics of radiation which is used to indicate the condition of the load operating circuit need not be changed when the condition of the load operating circuit changes.

A further object of the invention is to provide a novel and improved optical junction which can be used in the apparatus of the above outlined character.

Still another object of the invention is to provide an apparatus wherein the optomechanical transducer or actuator can be mounted at any desired practical distance from the photodetector.

A further object of the invention is to provide a novel and improved method of operating a photoelectric switch with means for displaying the condition of the photodetector.

Another object of the invention is to provide an apparatus which can be used as a superior substitute for heretofore known apparatus including those disclosed in the aforementioned patents to Harmer and Thalmann.

One feature of the invention resides in the provision of an apparatus for controlling a load which comprises a load operating circuit, first and second radiation sources, a photodetector which is responsive to radiation from one of the sources to change the condition of the circuit, and an optomechanical transducer or actuator which defines a path for radiation from the sources and includes means for reflecting radiation from the one source to the photodetector. The reflecting means can comprise a mirror movable between first and second positions in which the quantity of reflected radiation from the one source respectively suffices and is insufficient to effect a change in the condition of the circuit (by way of the photodetector). The apparatus further comprises means for changing the intensity of radiation which issues from the other source in response to changes in the condition of the circuit. The path includes a substantially conically diverging portion, and the mirror includes a surface which reflects radiation from the one source, which is disposed substantially transversely of the direction of propagation of radiation along the conically diverging portion of the path, and which has an area at least matching the smallest cross-sectional area of the conically diverging portion of the path. The mirror is movable in and counter to the direction of propagation of radiation along the conically diverging portion of the path.

The transducer has a radiation-transmitting cover or other suitable means for displaying radiation from the other source, and the apparatus further comprises means for conveying radiation from the sources to the transducer and from the transducer to the photodetector. An end portion of such conveying means (e.g., a single optical conductor or a bundle of fiber optics) is adjacent or is mounted in the transducer, and the path for radiation from the two sources extends between such end portion of the conveying means and the displaying means. The radiation which issues from the one source impinges upon the surface of the mirror and is reflected back into the conveying means but the radiation which issues from the other source passes through the mirror to reach the displaying means, at least when the mirror assumes one of its positions, i.e., when the means for changing the intensity of radiation which issues from the other source permits radiation to issue from the other source and to propagate itself toward and through the mirror.

The area of the reflecting surface on the mirror can equal or exceed the maximum cross-sectional area of the conically diverting portion of the path.

Each of the radiation sources can emit visible light, and the wavelength of radiation which issues from one of the sources is different from the wavelength of radiation which issues from the other source. The one source can emit invisible light.

The intensity changing means can include means for interrupting the emission of radiation from the other source in one position of the mirror, particularly when the mirror assumes a position in which the photodetector cannot activate the load operating circuit.

Another feature of the present invention resides in the provision of an optical junction which is particularly suited for use in the aforediscussed apparatus. The junction comprises a plurality of radiation admitting conductors (e.g., one for each of the radiation sources) having radiation emitting ends or end portions, and at least one radiation receiving conductor having a radiation receiving end and leading to the photodetector. The ends of the radiation admitting and receiving conductors are substantially parallel with and adjacent each other, and the junction also comprises a further or additional conductor which has an end arranged to receive radiation from the emitting ends and to admit radiation to the receiving end, and means for shielding the radiation emitting ends from the radiation receiving end. The junction preferably further comprises a substantially tubular envelope which has first and second open ends and is designed to prevent penetration of radiation which is emitted by the admitting and further conductors and is received by the further and receiving conductors. The emitting ends and the receiving end extend into the envelope by way of one open end, and the end of the further conductor extends into the envelope by way of the other open end. The arrangement is preferably such that the ends of the admitting and receiving conductors abut the end of the further conductor in the interior of the envelope.

The shielding means is disposed in the envelope and can comprise a layer or another suitable barrier which is impermeable to radiation issuing from the ends of the admitting conductors and from the further conductor.

The radius of the end of the further conductor can equal or approximate the diameters of the ends of the admitting and receiving conductors. Each such conductor can constitute a single fiber optic conductor or a bundle of fiber optic conductors.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a schematic elevational view of an apparatus which embodies one form of the invention;

FIG. 2 is an enlarged view of the optical junction in the apparatus of FIG. 1, the tubular envelope of the junction being shown in axial section;

FIG. 3 is a sectional view as seen in the direction of arrows from the line III—III of FIG. 2.

DESCRIPTION OF THE PREFERRED EMBODIMENTS

Figure 4:
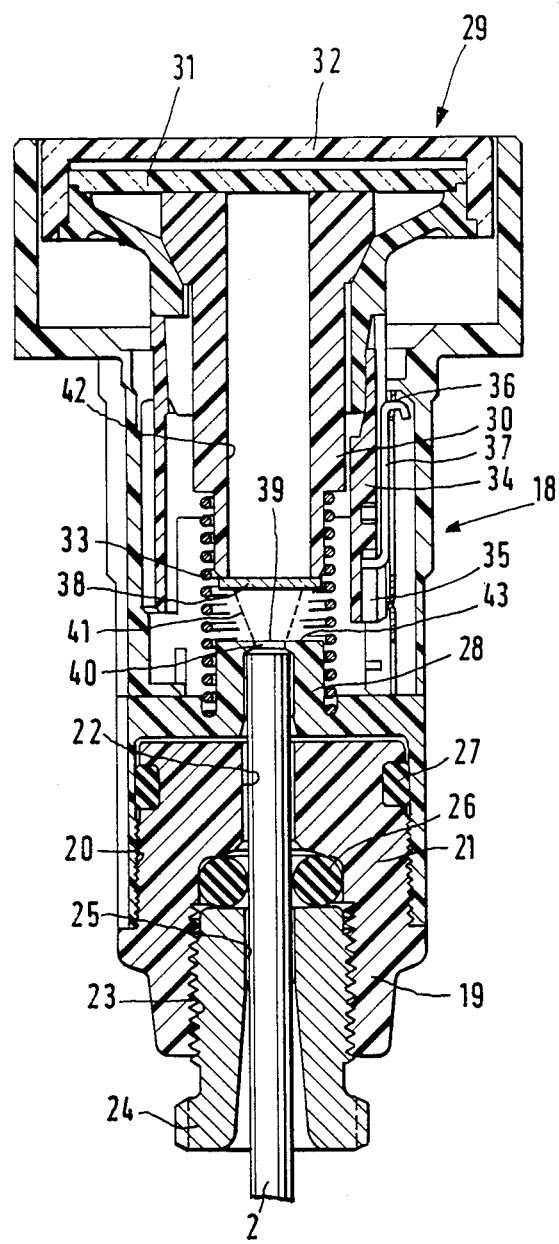
FIG. 4 is an enlarged axial sectional view of the optomechanical transducer.

The apparatus which is shown in FIG. 1 comprises an electrooptical transducer 1 which is assumed to be installed in a neutral environment "A" and is connected with an optomechanical transducer 3 by a single fiber optic conductor 2. The transducer 3 is installed in a non-neutral (e.g., an explosive) environment "B". The sheath of the conductor 2 is not specifically shown in the drawing.

The electrooptical transducer 1 comprises a first radiation source 4, a second radiation source 5, a photodetector 6, an energy source 8, a load operating circuit which includes a switch 9, and a device 9a for changing the intensity of radiation which issues from the source 5 (e.g., between zero and maximum intensity). The energy source 8 is connected with the photodetector 6 and with the radiation sources 4, 5, and the intensity changing device 9a can receive an appropriate signal in response to actuation of the switch 9 in the load operating circuit. The sources 4 and 5 are assumed to be capable of emitting visible light. An optical junction 7 is provided to convey radiation from radiation admitting conductors 10, 11 (FIGS. 2-3) to the conductor 2 and from the conductor 2 to a radiation receiving conductor 12. The wavelength of radiation which can be emitted by the source 4 is different from that which can be emitted by the radiation source 5. The sensitivity of the photodetector 6 is selected in such a way that the photodetector responds to radiation from the source 4.

The operation of the optoelectrical transducer 1 is such that radiation which issues from the source 4 and passes through the conductors 10, 2 to the transducer 3 is reflected by a mirror 38 of the transducer 3 to be conveyed by the conductors 2, 12 on to the photodetector 6. If the intensity of such radiation is sufficient, the photodetector 6 actuates the switch 9 to bring about an appropriate change in the condition of the load operating circuit. At the same time, the switch 9 causes the device 9a to change the intensity of radiation which issues from the source 5, e.g., from zero to a maximum value. Such radiation propagates itself by way of the conductors 11, 2 and passes through the mirror 38 to illuminate a cover 32 in a depressible pushbutton or knob 29 of the optomechanical transducer 3 so that the cover 32 displays or signals the condition of the load operating circuit.

The junction 7 is shown in detail in FIGS. 2 and 3. The left-hand ends of the conductors 10, 11, 12 are parallel to each other and extend into the interior of a sleeve-like tubular envelope 16 by way of one open end of the envelope. The end 13 of the conductor 2 extends into the envelope 16 by way of the other open end and abuts the ends of the conductors 10, 11 and 12. The envelope 16 is or can constitute a cylinder which is impermeable to radiation issuing from the sources 4 and 5 and confines a barrier or shroud 17 serving to shield the end of the conductor 12 from stray light (if any) issuing from the ends of the conductors 10 and 11. The radius of the end 13 of the conductor 2 can equal or approximate the diameters of the ends of the conductors 10, 11, 12 in the envelope 16 (see FIG. 3). Each of the conductors 10, 11, 12 can constitute a single fiber optic conductor, the same as the conductor 2. The barrier 17 can be made of a material which is impermeable to radiation issuing from the sources 4 and 5 so as to ensure that the end of the conductor 12 can receive radiation (issuing from the source 4) solely from the end 13 of the conductor 2, i.e., the conductor 12 can receive only such radiation which is reflected by the surface 38a of the mirror 38 in the optomechanical transducer 3. Alternatively, the material of the barrier 17 can have a refraction index such that it can effectively shield the end of the conductor 12 from stray radiation (if any) which issues from the ends of the conductors 10 and 11.

The details of a presently preferred embodiment of the optomechanical transducer 3 are shown in FIG. 4. The transducer 3 comprises a housing 18 including a rear portion 19 which is separably connected with the front portion 19a by threads 20. The rear portion 19 comprises a cylindrical body 21 with an axial bore or hole 22, and a larger-diameter tapped bore 23 in register with the bore 22. The thread which surrounds the bore 23 mates with the external thread of a hollow screw 24 whose axial bore is denoted by the character 25. The end portion 2a of the conductor 2 extends into and beyond the bore 25 and is held in the front portion 19 by a ring 26 of rubber or other suitable elastomeric material which is deformed in response to adequate introduction of the screw 24 so that the end portion 2a is held against any accidental axial movement relative to the housing 18 of the transducer 3.

A sealing ring 27 is interposed between the front and rear portions 19, 19a of the housing 18. Such portions are fixedly secured to each other so that they remain in preselected positions but can be separated from each other if and when necessary.

The tip of the end portion 2a of the conductor 2 extends into a cylindrical bearing 28 which is coaxial with the pushbutton 29. The latter comprises a cylindrical portion 30 the upper or outer end portion of which carries a color filter 31 at the inner side of the cover 32. The cover 32 transmits radiation which issues from the source 5, i.e., that radiation which is used to denote the condition of the load operating circuit including the switch 9.

The end face 39 of the end portion 2a of the conductor 2 is disposed at one end of a path 40–42 which includes a conical portion 41 diverging toward the filter 31 and cover 32 of the pushbutton 29. The cylindrical portion 40 of the path for radiation from the sources 4 and 5 is defined by the internal surface of the bearing 28 adjacent the end face 39, and the cylindrical portion 42 of the path is defined by a mirrored internal surface of the cylindrical portion 30 of the pushbutton 29.

The mirror 38 transmits radiation from the source 5 but reflects radiation from the source 4. The area of the reflecting surface 38a of the mirror at least matches but preferably exceeds the smallest cross-sectional area of the conically diverging portion 41 of the path 40–42 but can be selected in such a way that it matches or exceeds the maximum cross-sectional area of the portion 41. The surface 38a extends transversely of the direction of propagation of radiation from the end face 39 toward the filter 31, and the mirror 38 is movable with the pushbutton 29 in and counter to the direction of propagation of radiation from the portion 40 toward the portion 42 of the path.

It will be seen that only that radiation which issues from the source 5 can reach the cover 32, and such radiation reaches the cover 32 (to enable the latter to constitute a means for displaying the condition of the load operating circuit including the switch 9) only when the device 9a enables the source 5 to transmit radiation via conductors 11 and 2.

The pushbutton 29 is movable between the illustrated retracted (one) position and a second position in which the mirror 38 is nearer to the end face 39 of the end portion 2a of the conductor 2. When moved to the second or depressed position, the pushbutton 29 can maintain the surface 38a of the mirror 38 in actual contact with the end face 43 of the bearing 28.

An important advantage of the aforediscussed dimensions of the surface 38a is that radiation which issues from the source 4 cannot reach the cover 32 and, therefore, cannot influence the hue of radiation which is emitted by the source 5 and reaches the cover 32 when the load operating circuit is activated by way of the photodetector 6. This applies for the two end positions as well as for each intermediate position of the pushbutton 29 and the mirror 38.

The feature that the mirror 38 is movable in and counter to the direction of propagation of radiation from the source 5 toward the cover 32 is desirable and advantageous because the quantity of radiation which issues from the source 5 and is reflected by the mirror 38 back into the end portion 2a of the conductor 2 varies with the square of the distance of the surface 38a from the end face 39 of the end portion 2a. Thus, it suffices to provide for the pushbutton 29 an extremely short path for movement between its two end positions in order to change the condition of the photodetector 6 and hence the condition of the load operating circuit including the switch 9. As mentioned above, the area of the surface 38a need not exceed the smallest cross-sectional area of the conical portion 41 of the path 40–42 (immediately adjacent the cylindrical portion 40 of such path). Such reduction of the area of the surface 38a may result in propagation of some radiation from the source 4 to the cover 32 but the amount of such radiation is not sufficient to adversely or undesirably influence the tone or hue of the cover 32 when the latter is illuminated by radiation issuing from the source 5. Furthermore, the mirror 38 can transmit some radiation from the source 4, as long as the quantity of radiation from the source 4 which reaches the cover 32 does not suffice to appreciably distort the color of the cover, i.e., to appreciably influence the color of light which is emitted by the source 5 and is used to illuminate the cover 32.

The pushbutton 29 is permanently biased to the extended position of FIG. 4 by a prestressed coil spring 33 which reacts against the housing portion 19a and bears against an external shoulder of the cylindrical portion 30. A cylindrical portion 34 of the pushbutton 29 is formed with an external heart-shaped cam groove 35 for the suitably bent end portion of a lever 37 which is fulcrumed at 38. The purpose of the lever 37 is to ensure that the pushbutton 29 acts not unlike a so-called latching (alternate action) switch which is held in the depressed position against the opposition of the coil spring 33 in response to a first depression and returns to the extended position under the action of the spring 33 in response to the next-following depression. If the lever 37 is removed, the pushbutton 29 acts not unlike a so-called momentary switch, i.e., the pushbutton remains in depressed position only as long as the operator applies pressure against the outer side of the cover 32 so as to overcome the resistance of the spring 33. Reference may be had to the commonly owned U.S. Pat. No. 4,398,075 granted Aug. 9, 1983 to Ernst Vogel for "Mechanical switch".

The environment "B" can constitute a chamber or compartment which contains vapors of certain types of solvents which are likely to explode in response to the generation of a spark, e.g., by an electric switch. Such solvents are often used in paint and lacquer making plants.

The mirror 38 can reflect certain amounts of radiation which is emitted by the source 5; however, the thus reflected radiation should not adversely influence the reliability of the photodetector 6, i.e., the ability of radiation which issues from the source 4 and is reflected by the mirror 38 to change the condition of the photodetector 6 and load operating circuit in a predictable manner.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for controlling a load, comprising a load operating circuit; first and second radiation sources; a photodetector responsive to radiation from one of said sources to change the condition of said circuit; an optomechanical transducer defining a path for the radiation from said sources and including means for reflecting radiation from said one source to said photodetector, said path including a substantially conically diverging portion and said reflecting means including a radiation reflecting surface disposed substantially transversely of the direction of propagation of radiation along said portion of said path and having an area at least matching the smallest cross-sectional area of said portion of said path; means for moving said reflecting means in and counter to said direction between first and second positions in which the quantity of reflected radiation from said one source respectively suffices and is insufficient to effect a change in the condition of said circuit; and means for changing the intensity of radiation which issues from the other of said sources in response to changes in the condition of said circuit.

2. The apparatus of claim 1, wherein said transducer has means for displaying radiation from said other source and further comprising means for conveying radiation from said source to said transducer and from said transducer to said photodetector, said conveying means having an end portion and said path extending between said end portion and said displaying means.

3. The apparatus of claim 1, wherein the area of said reflecting surface at least matches the maximum cross-sectional area of said portion of said path.

4. The apparatus of claim 1, wherein each of said radiation sources emits visible light and the wavelength of visible light from said first source deviates from the wavelength of visible light from said second source.

5. The apparatus of claim 1, wherein said one source emits invisible light.

6. The apparatus of claim 5, wherein said intensity changing means includes means for interrupting the emission of radiation from said other source in one position of said reflecting means.

7. An optical junction, particularly for use in apparatus for controlling a load operating circuit, comprising a plurality of radiation admitting conductors having radiation emitting ends; at least one radiation receiving conductor having a radiation receiving end, said ends being substantially parallel with and adjacent each other; a further conductor having an end arranged to receive radiation from said emitting ends and to transmit radiation to said receiving end; and means for shielding said emitting ends from said receiving end.

8. The junction of claim 7, further comprising a tubular envelope having a first and a second open end and being impermeable to radiation which is emitted by said admitting conductors and said further conductor, said emitting ends and said receiving end extending into said envelope by way of one of said open ends and said end of said further conductor extending into said envelope by way of the other of said open ends.

9. The junction of claim 8, wherein the ends of said admitting and receiving conductors abut the end of said further conductor in the interior of said envelope.

10. The junction of claim 8, wherein said shielding means is disposed in said envelope and comprises a barrier which is impermeable to radiation issuing from the ends of said admitting conductors and said further conductor.

11. The junction of claim 8, wherein the diameter of the end of said further conductor is approximately twice the diameters of the ends of said admitting and receiving conductors.

* * * * *